(12) United States Patent  (10) Patent No.: US 7,599,919 B2
Oguri et al.  (45) Date of Patent: Oct. 6, 2009

(54) IMAGE FORMING APPARATUS

(75) Inventors: Satoshi Oguri, Osaka (JP); Toshinobu Yoshida, Osaka (JP); Manami Kawamoto, Osaka (JP); Kenichi Mizusu, Osaka (JP)

(73) Assignee: Kyocera Mita Corporation (JP)

( * ) Notice: Subject to any disclaimer, the term of this patent is extended or adjusted under 35 U.S.C. 154(b) by 373 days.

(21) Appl. No.: 11/288,864

(22) Filed: Nov. 29, 2005

(65) Prior Publication Data

US 2006/0116993 A1  Jun. 1, 2006

(30) Foreign Application Priority Data

Nov. 30, 2004  (JP)  ............... 2004-345969

(51) Int. Cl.
G06F 7/00  (2006.01)
G06F 17/30  (2006.01)
(52) U.S. Cl. ........................ 707/3; 707/104.1
(58) Field of Classification Search ............... 707/1–10, 707/100–104.1, 200–206; 715/255
See application file for complete search history.

(56) References Cited

FOREIGN PATENT DOCUMENTS

| JP | 7-85239 | 3/1995 |
| JP | 07085239 | * 3/1995 |
| JP | 9-224113 | 8/1997 |
| JP | 9-321922 | 12/1997 |

OTHER PUBLICATIONS

Bhalotia et at., Keyword searching and browsing in databases using BANKS, Feb. 26-Mar. 1, 2002, IEEE, 431-440.*
Ze-Nian Li et al., C-BIRD: content-based image retrieval from digital libraries using illumination invariance and recognition kernel, Aug. 26-28, 1998, IEEE, 361-366.*

* cited by examiner

Primary Examiner—Jean B Fleurantin
(74) Attorney, Agent, or Firm—Gerald E. Hespos; Anthony J. Casella

(57) ABSTRACT

A plurality of data are stored in a HDD while being compiled into a database. A scanner unit reads a search sheet having a search item selected by a user thereon. A data searching device specifies the search item based on a search sheet image read by the scanner unit and searches data corresponding to the specified search item. A display controller causes a touch panel section to display a search result given by the data searching device. Accordingly, an image forming apparatus having improved operability in data search can be provided.

17 Claims, 7 Drawing Sheets

IMAGE FORMING APPARATUS

BACKGROUND OF THE INVENTION

1. Field of the Invention

The present invention relates to an image forming apparatus for searching data stored in a memory.

2. Description of the Related Art

There have been conventionally known image forming apparatuses in which image data read by an image reader such as a scanner are accumulated as documents in a large-capacity storage medium such as a hard disk drive, at least one of keywords of targeted documents including document numbers of documents to be searched or the dates of generating the documents is entered as the scope of the search to search the documents accumulated in the large-capacity storage medium, and only the searched documents are selectively displayed (see, for example, Japanese Unexamined Patent Publication No. H07-85239).

In recent years, thought have been put into an image forming apparatus having a database function. In such an image forming apparatus, image data read by a scanner, received facsimile data and other data are stored in an internal hard disk drive to compile a database.

A display unit of the above image forming apparatus is designed to be considerably smaller as compared to monitors of PCs (personal computers) and the like. Thus, if a large amount of data correspond with the keyword upon searching data registered in the database by entering the keyword(s), it is difficult to display all the searched data.

Further, in the above image forming apparatus, the keyword for the search needs to be directly entered in the display unit. Thus, it is troublesome to users unaccustomed to operations to enter the keyword, presenting a problem in operability.

SUMMARY OF THE INVENTION

In view of the problem residing in the prior art, an object of the present invention is to provide an image forming apparatus having an improved operability in data search.

According to an aspect of the invention, an image forming apparatus comprises a data storage device for storing a plurality of data while compiling them into a database; a reader for reading a search sheet having at least one search item or search keyword selected by a user thereon; a data searcher for specifying the search item based on a search sheet image read by the reader and searching data corresponding to the specified search item in the data storage device or specifying the search keyword based on the search sheet image read by the reader and searching data corresponding with the specified search keyword; and a display device for displaying a search result given by the data searcher.

With this construction, a plurality of data are stored in the data storage device while being compiled into the database, and the search sheet having at least one search item or search keyword selected by the user thereon is read by the reader. Subsequently, by the data searcher, the search item is specified based on the search sheet image read by the reader and the data corresponding to the specified search item are searched in the data storage device or the search keyword is specified based on the search sheet image read by the reader and the data corresponding with the specified search keyword are searched in the data storage device.

Since at least one search item or search keyword is selected from a plurality of search items or a plurality of search keywords using the printed search sheet, a cumbersome operation of entering a search keyword using the display device becomes unnecessary, thereby improving operability in data search.

These and other objects, features, aspects and advantages of the present invention will become more apparent upon a reading of the following detailed description and accompanying drawings.

DETAILED DESCRIPTION OF THE PREFERRED EMBODIMENTS

Hereinafter, one embodiment of the present invention is described with reference to the accompanying drawings. It should be noted that this embodiment is merely a specific example of the present invention and does not restrict the technical scope of the present invention.

Figure 1:
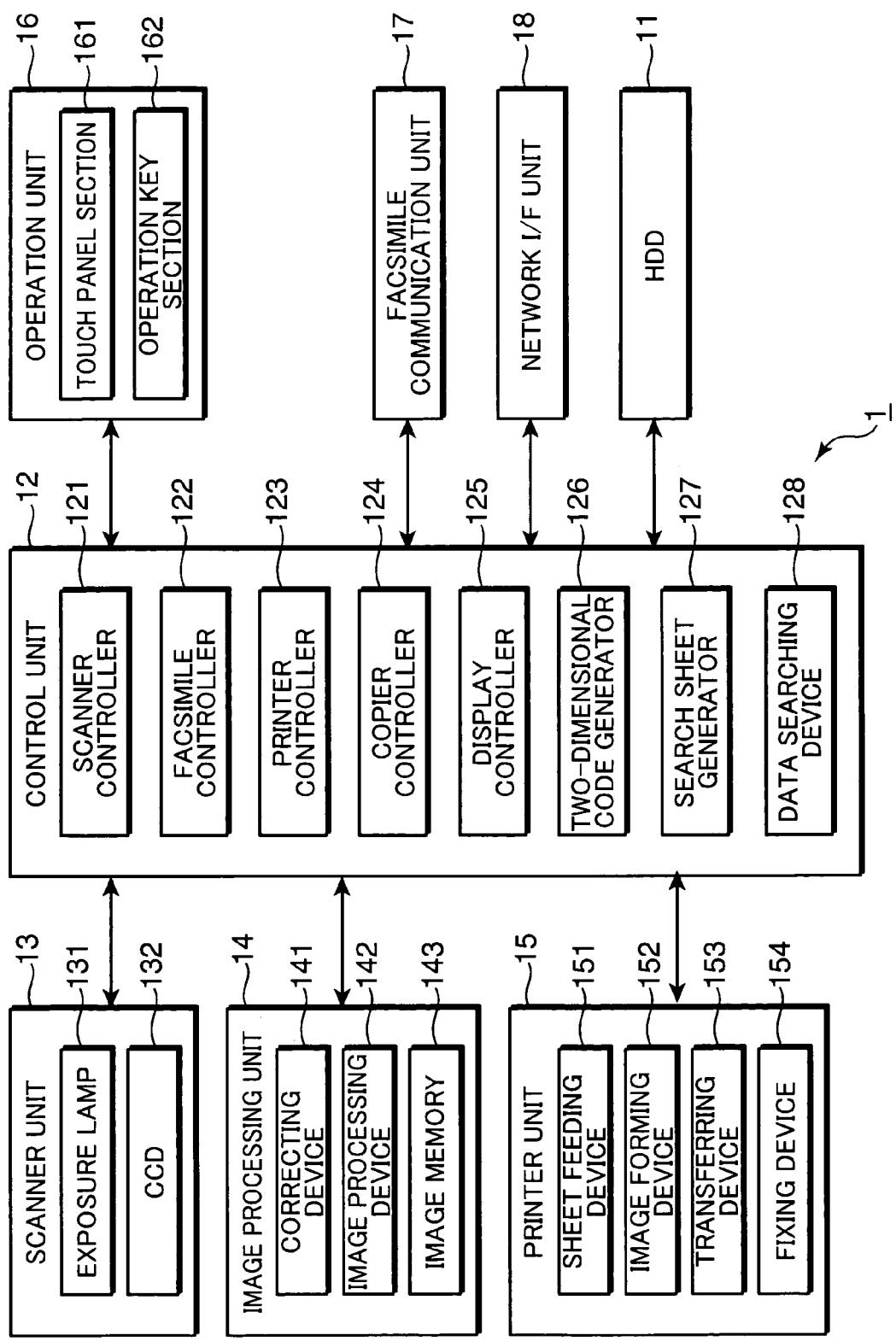
FIG. 1 is a block diagram schematically showing an internal construction of a composite apparatus as one example of an image forming apparatus according to one embodiment of the invention.

FIG. 1 is a block diagram schematically showing an internal construction of a composite apparatus as one example of an image forming apparatus according to one embodiment of the present invention. A composite apparatus 1 as one example of the image forming apparatus is a copier having composite functions such as a scanner function, a facsimile function, a printer function and a copier function. In the composite apparatus 1, various functions are realized by combining the above functions.

The composite apparatus 1 includes a HDD 11, a control unit 12, a scanner unit 13, an image processing unit 14, a printer unit 15, an operation unit 16, a facsimile communication unit 17 and a network I/F (interface) unit 18.

In this embodiment, the scanner function is realized by the HDD 11, the control unit 12, the scanner unit 13, the image processing unit 14 and the operation unit 16. The facsimile function is realized by the HDD 11, the control unit 12, the scanner unit 13, the image processing unit 14, the printer unit 15, the operation unit 16 and the facsimile communication unit 17. The printer function is realized by the HDD 11, the control unit 12, the image processing unit 14, the printer unit 15 and the network I/F unit 18. The copier function is realized by the HDD 11, the control unit 12, the scanner unit 13, the image processing unit 14, the printer unit 15 and the operation unit 16.

The operation unit 16 is comprised of a touch panel section 161 including a touch panel and the like, and an operation key section 162 including a start key and a numeric keypad. The operation unit 16 is used by a user to carry out operations relating to the scanner function, the facsimile function, the printer function, the copier function and other functions and data searching operations, and gives operation commands and the like from the user to the control unit 12. The touch panel section 161 is constructed by a touch panel unit which is a combination of a touch panel and a LCD (liquid crystal display), and displays various operation screens, e.g., information on the document size, the copy size, and the number of sets to be printed and the like upon carrying out the copier function and also operations buttons and the like used by the user to enter various operation commands by touching. The operation key section 162 is used by the user to enter a copying command and the like. Further, the operation key section 162 receives the entry of characters.

The control unit 12 functions as a scanner controller 121, a facsimile controller 122, a printer controller 123, a copier controller 124, a display controller 125, a two-dimensional code generator 126, a search sheet generator 127 and a data searching device 128. The control unit 12 includes a microcomputer and a hardware circuit for exclusive use and controls the operation of the entire apparatus in accordance with a control program stored in an unillustrated ROM (read-only memory). The scanner controller 121 controls the operations of the respective components used to realize the scanner function. The facsimile controller 122 controls the operations of the respective components used to realize the facsimile functions. The printer controller 123 controls the operations of the respective components used to realize the printer functions. The copier controller 124 controls the operations of the respective components used to realize the copier functions.

The display controller 125 causes the touch panel section 161 to display a search menu screen for receiving the entry of a data search given by the user. The display controller 125 also causes the touch panel section 161 to display a data search result given by the data searching device 128 to be described later.

The two-dimensional code generator 126 specifies the direction of a recording sheet and generates a two-dimensional code (two-dimensional bar code) including position information used to specify the positions of check boxes to be described later and recognition information used to recognize as to whether or not the data search is to be executed. Although the two-dimensional code in this embodiment is a QR code in the form of a matrix (see FIG. 4E), the present invention is not particularly limited thereto, and may be a two-dimensional code in the form of another matrix or a two-dimensional code in the form of a stack.

The two-dimensional code generator 126 may further generate a two-dimensional code additionally including search pattern information representing which search items and which data have been selected if a plurality of search items have been already selected. The search pattern information is information representing the selection of "transmitting end" and "A" if "transmitting end" was selected as the search item and "A (name of a person or a company)" was selected as a data. In other words, the scanner unit 13 can recognize which search items and which data have been selected by reading the two-dimensional code.

The search sheet generator 127 generates a search sheet that receives the selection of at least one of a plurality of search items or at least one of a plurality of search keywords if an entry of printing a search sheet by the user is received on the search menu screen caused to be displayed by the display controller 125. It should be noted that the search sheet will be described later.

The data searching device 128 specifies the search item based on an image of the search sheet read by the scanner unit 13 to be described later, and searches data corresponding to the specified search item in the HDD 11. The data searching device 128 also specifies the search keyword based on the image of the search sheet read by the scanner unit 13 and searches data corresponding with the specified search keyword in the HDD 11.

The scanner unit 13 includes an exposure lamp 13 and CCDs (charge-coupled devices) 132 constructing a scanner for successively reading documents being conveyed. The scanner unit 13 illuminates the document by means of the exposure lamp 131 and receives the reflected light by means of the CCDs 132, thereby reading an image of the document, and outputs an image data corresponding to the read image to the image processing unit 14. The scanner unit 13 reads the search sheet having the search item entered by the user.

The image processing unit 14 includes a correcting device 141, an image processing device 142, and an image memory 143. The image processing unit processes a read image data by means of the correcting device 141 and the image processing device 142 if necessary, saves the processed image data in the image memory 143 or outputs it to the printer unit 15, the facsimile communication unit 17 or the network I/F unit 18. The correcting device 141 applies a specified correction such as a level correction or a Y-correction to the read image data. The image processing device 142 applies various processings to the image data such compression or decompression and enlargement or reduction.

The printer unit 15 is comprised of a sheet cassette accommodating sheets, a sheet feeding device 151, an image forming device 152, a transferring device 153, and a fixing device 154. The sheet feeding device 151 includes feed rollers and is adapted to dispense the sheet from the sheet cassette and feed it to the respective devices. The image forming device 152 includes a photosensitive drum to be uniformly charged; an exposure device for converting a modulated signal generated based on an image data of a document into a laser beam, outputting the converted laser beam, and forming an electrostatic latent image on the photosensitive drum; and a developing device for forming a toner image by supplying a specified developer to the photosensitive drum. The transferring device 153 includes a transfer roller and is adapted to transfer the toner image on the photosensitive drum to the sheet conveyed. The fixing device 154 includes fixing rollers and is adapted to fix the transferred toner image onto the sheet by heating. The printer unit 15 prints an image on a sheet using an image data such as a document data read by the scanner unit 13, a print data transmitted from a client PC (personal computer) or the like by a LAN via the network I/F unit 18 or a facsimile data received from an external facsimile apparatus or the like by means of the facsimile communication unit 17. Specifically, the sheet feeding device 151 feeds the sheet to the image forming device 152, which in turn forms the toner image corresponding to the above image data. The transferring device 153 transfers the toner image onto the sheet, and the fixing device 154 fixes the toner image onto the sheet to form an image. The printer unit 15 also prints the search sheet generated by the search sheet generator 127.

The facsimile communication unit 17 includes a coding/decoding device (not shown), a modem device (not shown) and a NCU (network control unit) (not shown). The facsimile communication unit 17 transmits an image data of a document read by the scanner unit 13 to a facsimile apparatus or the like via a telephone circuit and receives an image data (facsimile data) transmitted from a facsimile apparatus or the like. The coding/decoding device compresses and codes an image data to be transmitted while decompressing and decoding a received image data. The modem device modulates a compressed/coded image data into an audio signal and demodulates a received signal (audio signal) into an image data. The NCU controls the connection with the facsimile apparatus or the like as a transmitting/receiving end via the telephone circuit.

The network I/F unit 18 controls the transmission and reception of various data to and from client PCs and the like connected via the LAN using a network interface (e.g., 10/100Base-Tx) and, for example, receives a print data transmitted from a client PC or the like.

The HDD 11 is for saving various data such as image data read by the scanner unit 13 and output formats set in the read image data. Specifically, image data read by the scanner unit 13, image data (facsimile data) received by the facsimile communication unit 17 and image data or document data received by the network I/F unit 18 are stored in the HDD 11. Transmitting-end data, date data, destination data, file-name data and other data appended to the respective image data or the respective document data are stored in the HDD 11 while being compiled into a database. The image data stored in the HDD 1 are not only used in the composite apparatus 1, but also confirmed by the client CPs and the like via the network I/F unit 18 or transferred to specified folders of the client PCs and the like if necessary.

In this embodiment, the HDD 11 corresponds to one example of data storage device; the scanner unit 13 to one example of reader; the data searching device 128 to one example of data searcher; the display controller 125 and the touch panel section 161 to examples of display device, receiver, keyword entry receiver, search item display device and search item receiver; the printer controller 123 and the printer unit 15 to one example of printer; and the two-dimensional code generator 126 to one example of two-dimensional code generator.

Figure 2:
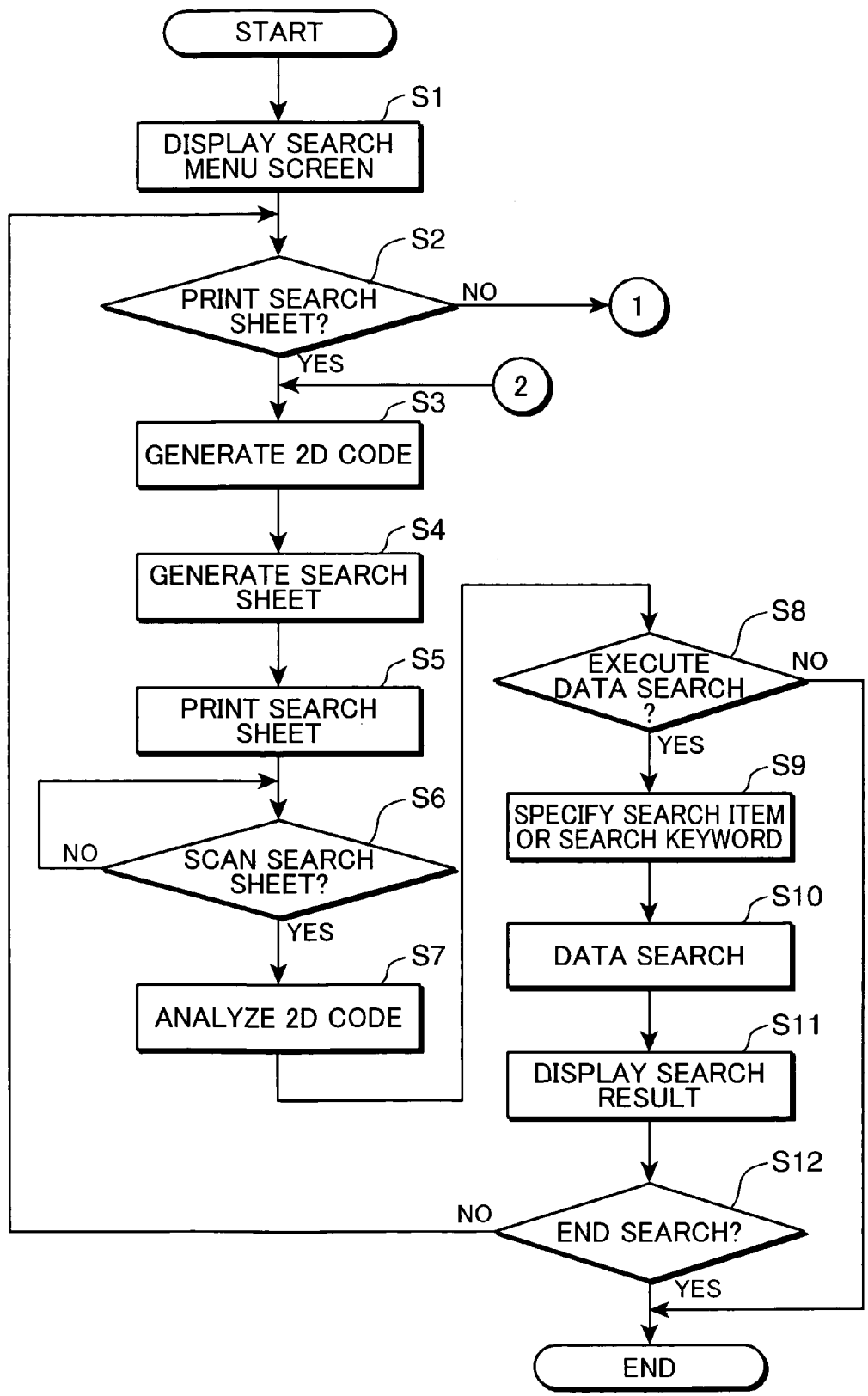
FIGS. 2 and 3 are a flow chart showing a data search processing of the composite apparatus shown in FIG. 1.
Figure 3:
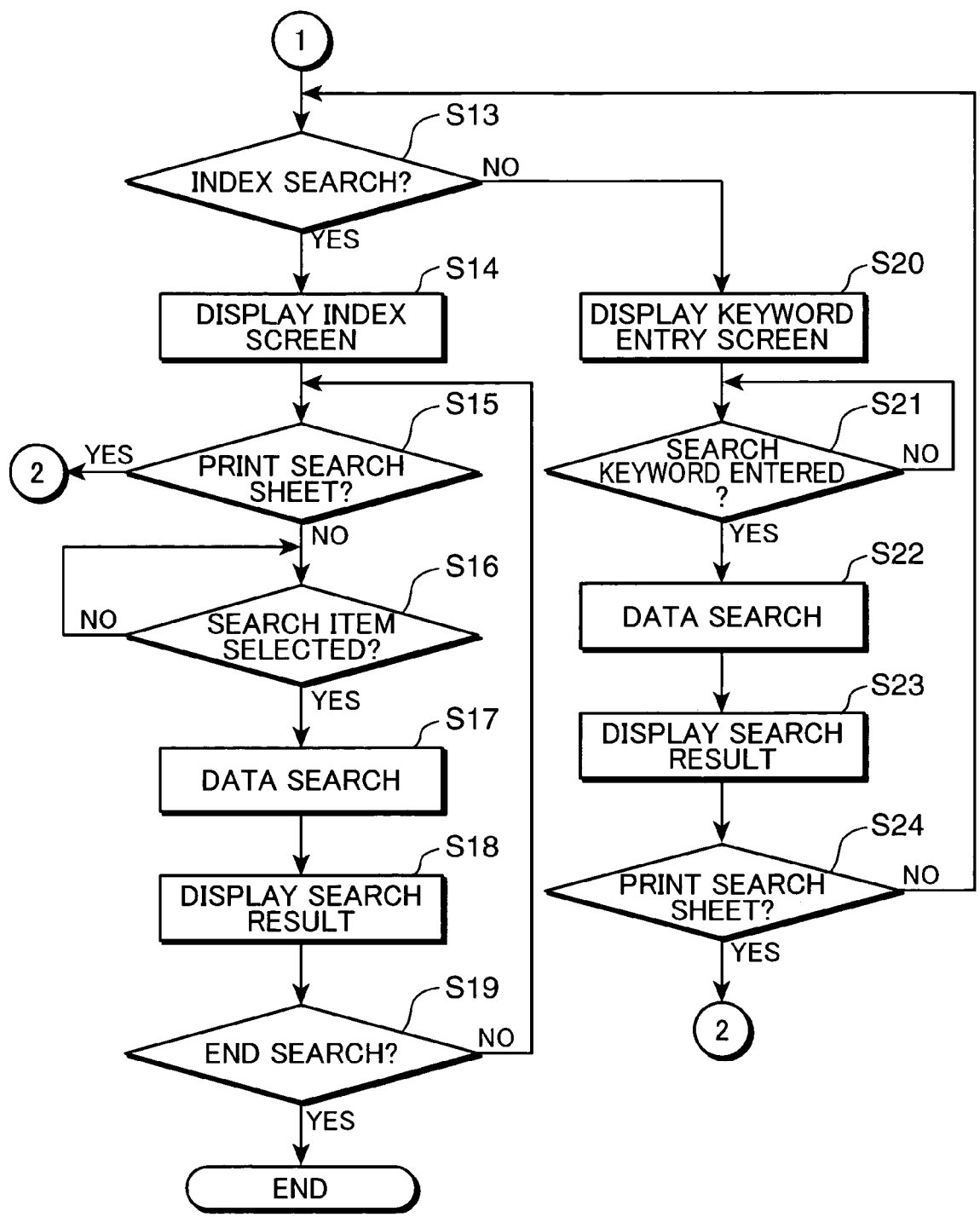
Figure 4A:
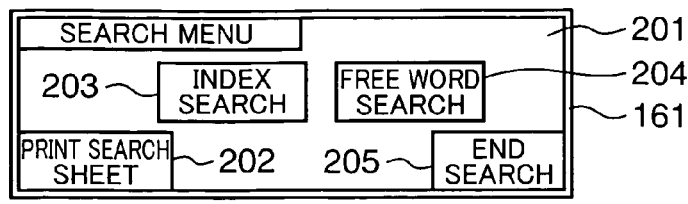
FIGS. 4A to 4E are diagrams showing a search by a search sheet.
Figure 4B:
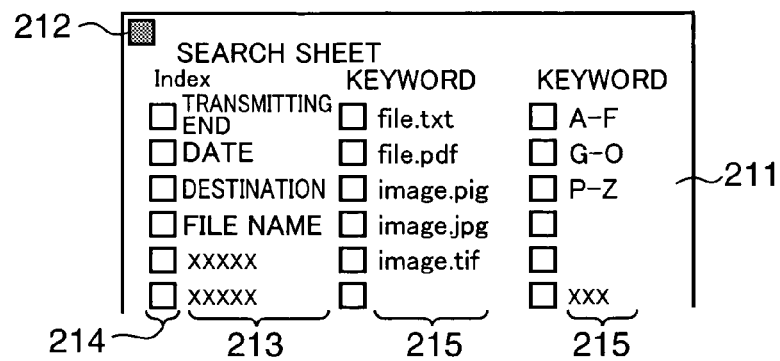
Figure 4C:
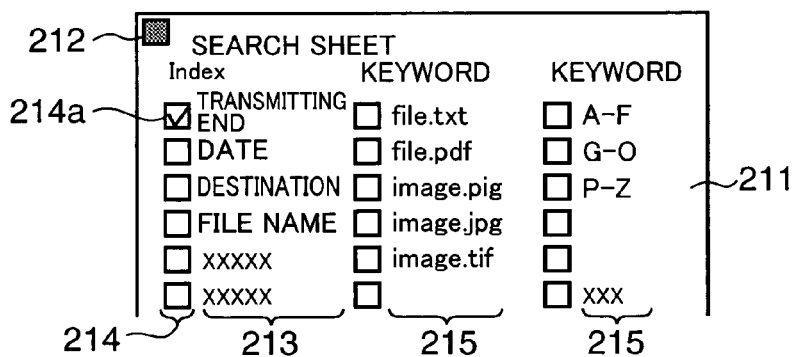
Figure 4D:
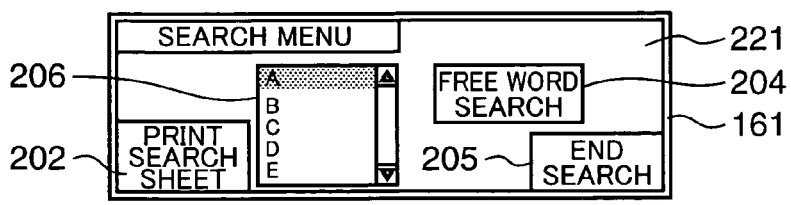
Figure 4E:
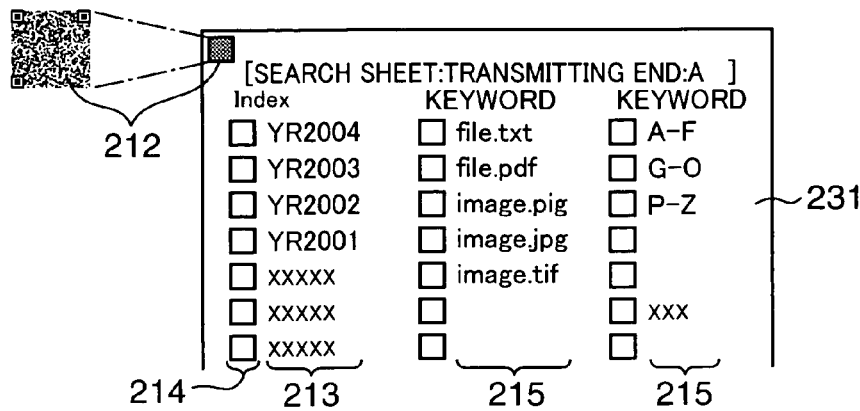

Next, the operation of the composite apparatus shown in FIG. 1 is described. FIGS. 2 and 3 are a flow chart showing a data search processing of the composite apparatus shown in FIG. 1, and FIG. 4A to 4E are diagrams showing the search by the search sheet, wherein FIG. 4A shows one example of a search menu screen, FIG. 4B shows one example of a printed search sheet, FIG. 4C shows one example of a search sheet having a check mark written down, FIG. 4D shows one example of a search result screen, and FIG. 4E shows one example of a search sheet further printed on the search result screen. In the description relating to FIGS. 2 and 3, it is assumed that data are already stored in the HDD 11 and a database is already compiled.

First, in Step S1, the display controller 125 causes the touch panel section 161 to display the search menu screen for receiving the selection of one search method from a plurality of search methods. In this embodiment, there are three kinds of search methods by index search, by free word search and by search sheet. The index search is a search method according to which a plurality of search items are displayed on the screen, the selection of the displayed search item by a user is received, and data corresponding to the received search item are searched. The free word search is a search method according to which the entry of a search keyword by the user is received, and data corresponding with the received search keyword are searched. The search by the search sheet is a search method according to which a search sheet printed with a plurality of search items, a plurality of search keywords and check boxes corresponding to the search items and the search keywords is printed, a user writes down a check mark in a check box of the printed search sheet, the search sheet having the check mark written down is scanned to specify the search item or the search keyword, and data corresponding to the specified search item or those corresponding with the specified keyword are searched.

The display controller 125 causes the touch panel section 161 to display a search menu screen 201 as shown in FIG. 4A. The search menu screen 201 includes a search sheet print button 202, an index search button 203, a free word search button 204 and a search end button 205.

Subsequently, in Step S2 of FIG. 2, the operation unit 16 receives an entry as to whether or not the search sheet is to be printed. Specifically, if the user touches the search sheet print button 202 of the search menu screen 201 displayed on the touch panel section 161, the operation unit 16 outputs a search sheet print instruction to the control unit 12. Here, this routine proceeds to Step S3 if the instruction to print the search sheet is received (YES in Step S2) while proceeding to Step S10 of FIG. 3 if no such instruction is received (NO in Step S2).

If the instruction to print the search sheet is received, the two-dimensional code generator 126 specifies the direction (top and bottom) of the search sheet and generates position information used to specify the positions of the check boxes and recognition information used to recognize whether or not the data search is to be executed. This position information includes position coordinates of the check boxes with respect to the position coordinates of the two-dimensional code. The scanner unit 13 can specify the positions of the check boxes by reading the two-dimensional code.

Subsequently, in Step S4, the search sheet generator 127 specifies the search items or the search keywords and generates the search sheet including a plurality of specified search items or a plurality of search keywords, the check boxes corresponding to the respective search items or search keywords, and the two-dimensional code generated by the two-dimensional code generator 126.

Subsequently, in Step S5, the printer unit 15 prints the search sheet generated by the search sheet generator 127. Here, the printer unit 15 prints a search sheet 211, for example, as shown in FIG. 4B. As shown in FIG. 4B, a two-dimensional code 212 is printed at the upper left corner of the search sheet 211. A plurality of search items 213, a plurality of search keywords 215, and check boxes 214 located at the left sides of the respective search items 213 and the respective search keywords 215 are printed on the search sheet 211. For example, "transmitting end", "date", "destination", "file name" and the like are printed as the search items 213. Further, "file.txt", "file.pdf", "image.pig", "image.jpg", "image.tif", "A to F", "G to O", "P to Z" and the like are printed as the search keywords 215. The "transmitting end" represents transmitting ends of received facsimile data; the "date" represents dates of receiving or transmitting facsimile data; the "destination" represents receiving ends of facsimile data; the "file name" represents file names of image data or document data; the "file.txt" represents files having an extension ".txt"; the "image.pig" represents image data having an extension ".pig"; the "A to F" represents data having file names whose capital letters are A to F. Transmitting-end data of the received facsimile data are stored in correspondence with the search item "transmitting end". Data on the dates of receiving or transmitting the facsimile data are stored in correspondence with the search item "date". Receiving-end data of the facsimile data are stored in correspondence with the search item "destination". File-name data of the image data or the document data are stored in correspondence with the search item "file name".

The user writes a check mark down in the check box corresponding to each desired search item or search keyword of the printed search sheet, and lets the search sheet read by the scanner unit 13. In other words, as shown in FIG. 4C, a check mark is written down in a check box 214a corresponding to the search item 213 "transmitting end" in the case of the search by the "transmitting end".

Subsequently, in Step S6 of FIG. 2, the scanner unit 13 judges whether or not the search sheet has been read (scanned). It should be noted that the scanner unit 13 recognizes the read document to be the search sheet by reading the two-dimensional code, and starts the data search. Here, this routine proceeds to Step S7 if the reading of the search sheet is judged (YES in Step S6) while entering a standby state if the reading of the search sheet is judged not to have been carried out yet (NO in Step S6).

If the reading of the search sheet is judged, the data searching device 128 detects the two-dimensional code included in an image read by the scanner unit 13 and analyzes the detected two-dimensional code in Step S7.

Subsequently, in Step S8, the data searching device 128 judges whether or not the data search is to be executed based on the recognition information included in the analyzed two-dimensional code. Specifically, the data searching device 128 carries out the data search if the recognition information specifying the execution of the data search is included in the two-dimensional code. This routine proceeds to Step 9 if the execution of the data search is judged (YES in Step S8), whereas the data search processing is ended if it is judged not to execute the data search (NO in Step S8). In other words, if the two-dimensional code includes no recognition information specifying the execution of the data search, the image read by the scanner unit 13 is not the search sheet. Thus, the data search processing is ended and the printer unit 15 prints the image read by the scanner unit 13.

If the execution of the data search is judged, the data searching device 128 specifies the search item or the search keyword written down with the check mark from the search sheet image read by the scanner unit 13 in Step S9. Specifically, the data searching device 128 specifies the position of the check box in the search sheet image based on the position information included in the two-dimensional code. Then, the data searching device 128 specifies the search item or the search keyword of the search sheet image for which the check mark was written down.

Subsequently, in Step S10, the data searching device 128 reads data corresponding to the specified search item from the HDD 11. For example, if the search item "transmitting end" is specified, the data searching device 128 searches the transmitting-end data corresponding to the search item "transmitting end" and reads the searched data from the HDD 11. The data searching device 128 also reads data corresponding with the specified search keyword from the HDD 11. For example, if the search keyword "A to F" is specified, the data searching device 128 searches the file-name data whose capital letters are alphabets A to F and reads the searched data from the HDD 11. If there are a plurality of data corresponding to the search item or corresponding with the search keyword, the data searching device 128 reads all the data from the HDD 11. At this time, if all the plurality of data corresponding to the search item or corresponding with the search keyword cannot be displayed on the touch panel section 161 at once, the data searching device 128 narrows down the search results using a plurality of search items or a plurality of search keywords.

Subsequently, in Step S11, the display controller 125 causes the touch panel section 161 to display the search result screen showing the search result given by the data searching device 128. Specifically, the display controller 125 causes the touch panel section 161 to display the data read by the data searching device 128. For example, in the case of the search by the "transmitting end", the display controller 125 causes the touch panel section 161 to display a search result screen 221 as shown in FIG. 4D. The search result screen 221 shown in FIG. 4D includes a search sheet print button 202, a free word search button 204, a search end button 205 and a search item selection area 206. In the search item selection area 206 are selectively displayed a plurality of data narrowed down by the search by the "transmitting end". The transmitting-end data "A" to "E" are displayed in the search item selection area 206 shown in FIG. 4D. It should be noted that "A" to "E" in FIG. 4D are data representing the names or company names of transmitters. If the names or company names are registered together with fax numbers beforehand, the name or company name of the transmitter can be specified from the received fax number. If neither the name nor company name of the transmitter is registered, the fax number is displayed as the transmitting-end data.

Subsequently, in Step S12 of FIG. 2, the display controller 125 judges whether or not the data search processing is to be ended. The data search processing is ended if the end of the data search processing is judged here (YES in Step S12). For example, if the search end button 205 is touched on the search result screen 221 shown in FIG. 4D, the data search processing is ended. If it is judged to continue the data search processing (NO in Step S12), this routine returns to Step S2. The search is narrowed down by executing the processing in Step S2 and succeeding Steps, whereby the user can search desired data. For example, if "A" in the search item selection area 206 is highlighted and the search sheet print bottom 202 is touched on the search result screen 221 shown in FIG. 4D, a search sheet shown in FIG. 4E is printed. The search sheet 231 shown in FIG. 4E is a search sheet used to narrow down the search of the transmitting-end data A. For example, "Yr 2004", "Yr 2003" and the like are printed as the search items 213; and "file.txt", "A to F" and the like are printed as the search keywords 215. "Yr 2004" represents data received from the transmitting end A in 2004.

On the other hand, if it is judged not to print the search sheet in Step S2 of FIG. 2, the operation unit 16 receives an entry as to whether or not the index search is to be executed in Step S13 of FIG. 3. Specifically, if the index search button 203 of the search menu screen 201 displayed on the touch panel section 161 is touched by the user, the operation unit 16 outputs an index search instruction to the control unit 12. This routine proceeds to Step S14 if the instruction to execute the index search is received (YES in Step S13) while proceeding to Step S20 if such an instruction is not received (NO in Step S13).

Figure 5A:
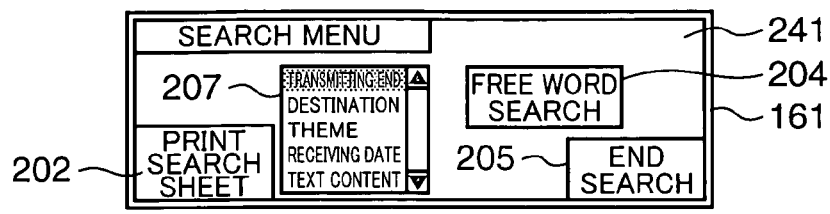
FIGS. 5A to 5C are diagrams showing an index search.
Figure 5B:
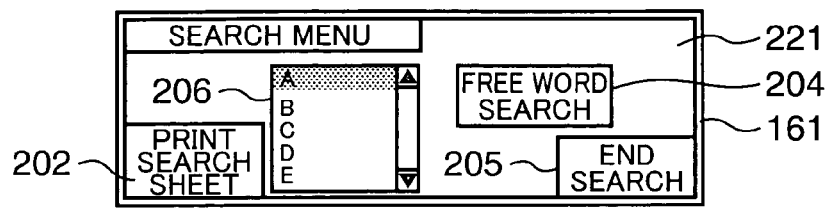
Figure 5C:
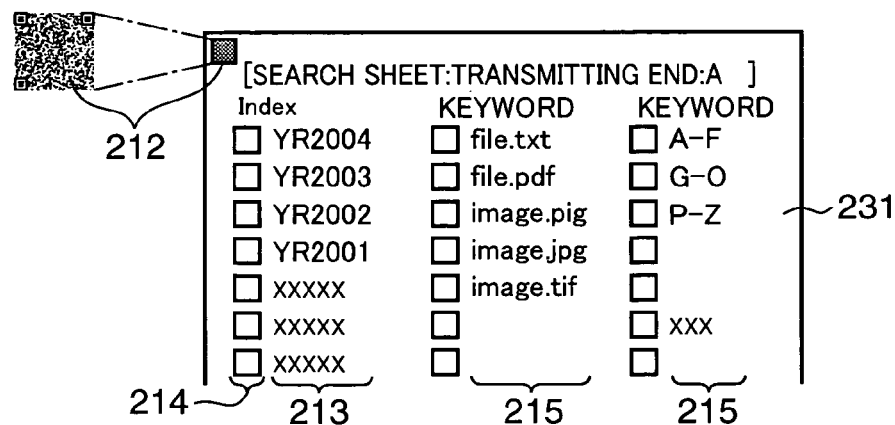

Subsequently, in Step S14, the display controller 125 causes the touch panel section 161 to display an index search screen used to receive the selection of one from a plurality of search items. FIGS. 5A to 5C are diagrams showing the index search, wherein FIG. 5A shows one example of the index search screen, FIG. 5B shows one example of a search result screen, and FIG. 5C shows one example of a search sheet printed on the search result screen.

For example, if the index search button 203 is touched by the user, the display controller 125 causes the touch panel section 161 to display an index search screen 241 shown in FIG. 5A. The index search screen 241 includes a search sheet print button 202, a free word search button 204, a search end button 205 and a search item selection area 207. In the search item selection area 207 are selectively displayed a plurality of search items. "Transmitting-end", "destination", "theme", "receiving date", and "text content" are displayed as selectable search items in the search item selection area shown in FIG. 5A.

Subsequently, in Step S15 of FIG. 3, the operation unit 16 receives an entry as to whether the search sheet is to be printed. Specifically, if the search sheet print button 202 of the index search screen 241 displayed on the touch panel section 161 is touched by the user, the operation unit 16 outputs an instruction to print the search sheet to the controller 12. This routine returns to Step S3 of FIG. 2 if the instruction to print the search sheet is received (YES in Step S15) while proceeding to Step S16 if no such instruction is received (NO in Step S15).

In the case of receiving no instruction to print the search sheet, the operation unit 16 judges whether or not one of a plurality of search items on the index search screen 241 displayed on the touch panel section 161 has been selected in Step S16. The user can select a desired search item by touching one of a plurality of search items displayed on the index search screen 241. This routine proceeds to Step S17 of FIG. 2 if it is judged that the search item has been selected (YES in Step S16) while entering a standby state till the search item is selected if it is judged that no search item has been selected (NO in Step S16).

If it is judged that the search item has been selected, the data searching device 128 reads data corresponding to the search item selected by means of the operation unit 16 in the HDD 11 in Step S17.

Subsequently, in Step S18, the display controller 125 causes the touch panel section 161 to display a search result screen showing a search result given by the data searching device 128. Specifically, the display controller 125 causes the touch panel section 161 to display data read by the data searching device 128. Here, the display controller 125 causes, for example, a search result screen 221 shown in FIG. 5B to be displayed. Since the search result screen 221 shown in FIG. 5B is similar to the search result screen 221 shown in FIG. 4D, it is not described.

Subsequently, in Step S19 of FIG. 3, the display controller 125 judges whether or not the data search processing is to be ended. The data search processing is ended, for example, if the search end button 205 is touched on the search result screen 221 shown in FIG. 5B. Here, the data search processing is ended if the end of the data search processing is judged (YES in Step S19). If it is judged to continue the data search processing (NO in Step S19), this routine returns to Step S15. By executing the processing in Step S15 and succeeding Steps, the search is narrowed down to enable the user to search desired data. For example, if "A" in the search item selection area 206 is highlighted and the search sheet print bottom 202 is touched on the search result screen 221 shown in FIG. 5B, a search sheet shown in FIG. 5C is printed. Since the search sheet 231 shown in FIG. 5C is similar to the search sheet 231 shown in FIG. 4E, it is not described.

On the other hand, if it is judged not to execute the index search in Step S13, i.e., if the free word search button 204 is touched on the search menu screen 201 and the execution of the free word search is judged, the display controller 125 causes the touch panel section 161 to display a keyword entry screen for receiving the entry of a search keyword by the user.

Figure 6A:
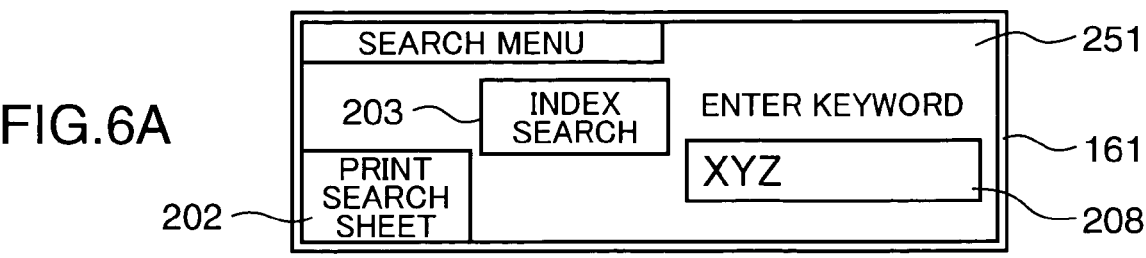
FIGS. 6A and 6B are diagrams showing a free word search.
Figure 6B:
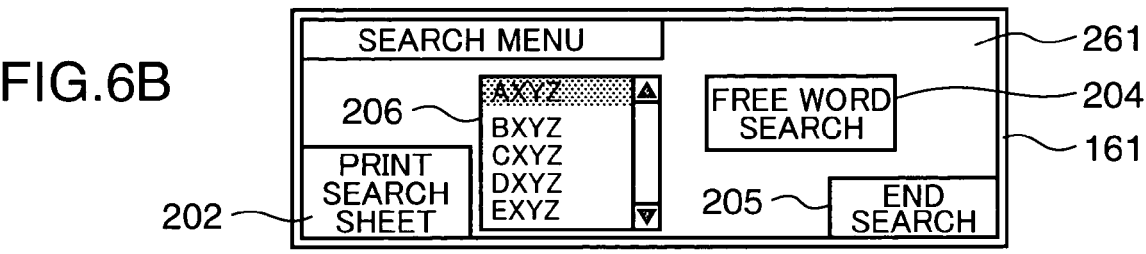

FIGS. 6A and 6B are diagrams showing the free word search, wherein FIG. 6A shows one example of a keyword entry screen and FIG. 6B shows one example of a search result screen.

For example, if the free word search button 204 is touched by the user, the display controller 125 causes the touch panel section 161 to display a keyword entry screen 251 shown in FIG. 6A. The keyword entry screen 251 includes a search sheet print button 202, an index search button 203, a search end button 205 and a keyword entry area 208. The user enters a desired search keyword (character) using the operation key section 162. A character "XYZ" is entered in the keyword entry area 208 shown in FIG. 6A.

Subsequently, in Step S21, the operation unit 16 judges whether or not any search keyword has been inputted by the user. This routine proceeds to Step S22 if the entry of the search keyword is judged (YES in Step S21) while entering a standby state till the search keyword is entered if it is judged that no search keyword has been entered (NO in Step S21).

If the entry of the search keyword is judged, the data searching device 128 reads data corresponding with the search keyword entered by means of the operation unit 16 in the HDD 11 in Step S22. The data searching device 128 reads all the data from the HDD 11 if there are a plurality of data corresponding with the search keyword. At this time, if all the plurality of data corresponding with the search keyword cannot be displayed on the touch panel section 161 at once, the data searching device 128 narrows down the search result using a plurality of search keywords. In other words, the data searching device 128 determines a plurality of search keywords to narrow the search down in order to specify data desired by the user if too many data correspond with the specified search keyword and cannot be displayed on the touch panel section 161 at once.

Subsequently, in Step S23, the display controller 125 causes the touch panel section 161 to display a search result screen showing a search result given by the data searching device 128. Specifically, the display controller 125 causes the touch panel section 161 to display the data read by the data searching device 128. For example, if the search keyword "XYZ" is entered on the keyword entry screen 251, the display controller 125 causes the touch panel section 161 to display a search result screen 261 shown in FIG. 6B. The search result screen 261 includes a search sheet print button 202, a free word search button 204, a search end button 205 and a search keyword selection area 206. In the search keyword selection area 206 of the search result screen 261 are selectively displayed "AXYZ", "BXYZ", "CXYZ", "DXYZ", and "EXYZ" including the search keyword "XYZ" entered in the keyword entry screen 251.

Subsequently, in Step S24, the operation unit 16 receives an entry as to whether or not the search sheet is to be printed. Specifically, if the search sheet print button of the search result screen displayed on the touch panel section 161 is touched by the user, the operation unit 16 outputs an instruction to print the search sheet to the controller 12. For example, if "AXYZ" in the search keyword selection area 206 is highlighted and the search sheet print bottom 202 is touched on the search result screen 261 shown in FIG. 6B, a search sheet for extended search by "AXYZ" is printed. This routine returns to Step S3 of FIG. 2 if the instruction to print the search sheet is received (YES in Step S24) while returning to Step S13 if no such instruction is received (NO in Step S24).

As described above, a plurality of data are stored in the HDD 11 while being complied into a database, and the search sheet including at least one search item or search keyword selected by the user is read by the scanner unit 13. Subsequently, the data searching device 128 specifies the search item based on the search sheet image read by the scanner unit 13, and searches data corresponding to the specified search item in the HDD 11. Alternatively, the data searching device 128 specifies the search keyword based on the search sheet image read by the scanner unit 13, and searches data corresponding with the specified search keyword in the HDD 11. The display controller 125 causes the touch panel section 161 to display a search result (data) searched by the data searching device 128.

Since at least one search item or search keyword is selected from a plurality of search items or a plurality of search keywords using the printed search sheet, a cumbersome operation of entering the search keyword using the touch panel section 161 is unnecessary, thereby improving operability in the data search.

Further, if the operation unit 16 receives the instruction to print the search sheet for selecting at least one search item or search keyword from a plurality of search items or a plurality of search keywords, the printer unit 15 prints the search sheet.

Since a plurality of search items or a plurality of search keywords are printed on the search sheet, all the search items or all the search keywords can be presented to the user even if it is difficult to display all the search items or all the search keywords on the touch panel section 161 of the composite apparatus 1.

Although the search menu screen is displayed and the instruction to print the search sheet is received when the user touches the search sheet print button of the displayed search menu screen in this embodiment, the present invention is not particularly limited thereto. The operation unit 16 may be provided with a button used to instruct the printing of the search sheet, and the instruction to print the search sheet may be received when the user presses this button down.

If there are a plurality of data corresponding to the search item or corresponding with the search keyword as a result of the search by the data searching device 128, the operation unit 16 receives the instruction to print the search sheet for selecting another search item or search keyword from a plurality of search items or a plurality of search keywords. Then, the printer unit 15 prints the search sheet. The scanner unit 13 reads the search sheet printed by the printer unit 15 and including at least one search item or search keyword selected by the user. Subsequently, the data searching device 128 specifies the search item based on the search sheet image read by the scanner unit 13 and searches data corresponding to the specified search item in the HDD 11. Alternatively, the data searching device 128 specifies the search keyword based on the search sheet image read by the scanner unit 13 searches data corresponding with the specified search keyword in the HDD 11. Then, the display controller 125 causes the touch panel section 161 to display the search result given by the data searching device 128.

The search sheet for selecting at least one search item or search keyword from a plurality of search items or a plurality of search keywords is printed if there are a plurality of data corresponding to the search item or corresponding with the search keyword as a result of the search by the data searching device 128. Hence, desired data can be finally presented to the user by repeatedly printing the search sheet, reading the search sheet and searching data.

Further, the printer unit 15 prints the search sheet including a plurality of search items or a plurality of search keywords and check boxes corresponding to the search items or the search keywords, and the scanner unit 13 reads the search sheet having the check box corresponding to the desired search item or search keyword checked by the user. The data searching device 128 specifies the search item corresponding to the check box checked by the user, and searches data corresponding to the specified search item in the HDD 11. Alternatively, the data searching device 128 specifies the search keyword corresponding to the check box checked by the user, and searches data corresponding to the specified search keyword in the HDD 11. Then, the display controller 125 causes the tough panel section 161 to display the search result given by the data searching device 128.

A plurality of search items or a plurality of search keywords and the check boxes are printed on the search sheet, and the user can easily designate the search item or the search keyword by writing a check mark down in the check box corresponding to the desired search item or search keyword.

Further, the two-dimensional code generator 126 generates the two-dimensional code for specifying the positions of the check boxes on the image read by the scanner unit 13, and the printer unit 15 prints two-dimensional code generated by the two-dimensional code generator 126 at a specified position on the search sheet. Then, the scanner unit 13 reads the search sheet printed by the printer unit 15 and having at least one search item or search keyword selected by the user. Subsequently, the data searching device 128 analyzes the two-dimensional code included in the image read by the scanner unit 13, specifies the search item or search keyword corresponding to the check box checked by the user on the search sheet image based on the position information included in the analyzed two-dimensional code, and searches data corresponding to the specified search item or corresponding with the search keyword in the HDD 11.

Since the positions of the check boxes are specified by the two-dimensional code, it is not necessary to specify a reading direction upon reading the search sheet and the search item or the search keyword selected by the user can be specified regardless of in which direction the search sheet is read.

The two-dimensional code generator 126 also generates the two-dimensional code including the recognition information used to recognize whether or not the data search is to be executed, and the printer unit 15 prints the two-dimensional code generated by the two-dimensional code generator 126 at a specified position of the search sheet. The scanner unit 13 reads the search sheet printed by the printer unit 15 and having at least one search item or search keyword selected by the user. Subsequently, the data searching device 128 analyzes the two-dimensional code included in the search sheet image read by the scanner unit 13, specifies the search item or the search keyword based on the search sheet image read by the scanner unit 13 and searches data corresponding to the specified search item or data corresponding with the specified search keyword in the HDD 11 if the analyzed two-dimensional code includes the recognition information representing the execution of the data search.

Since it can be judged whether or not the read document is a search sheet for data search by analyzing the two-dimensional code, it is not necessary to switch to the search function upon the data search, and the search function is automatically set to execute the data search.

Figure 7:
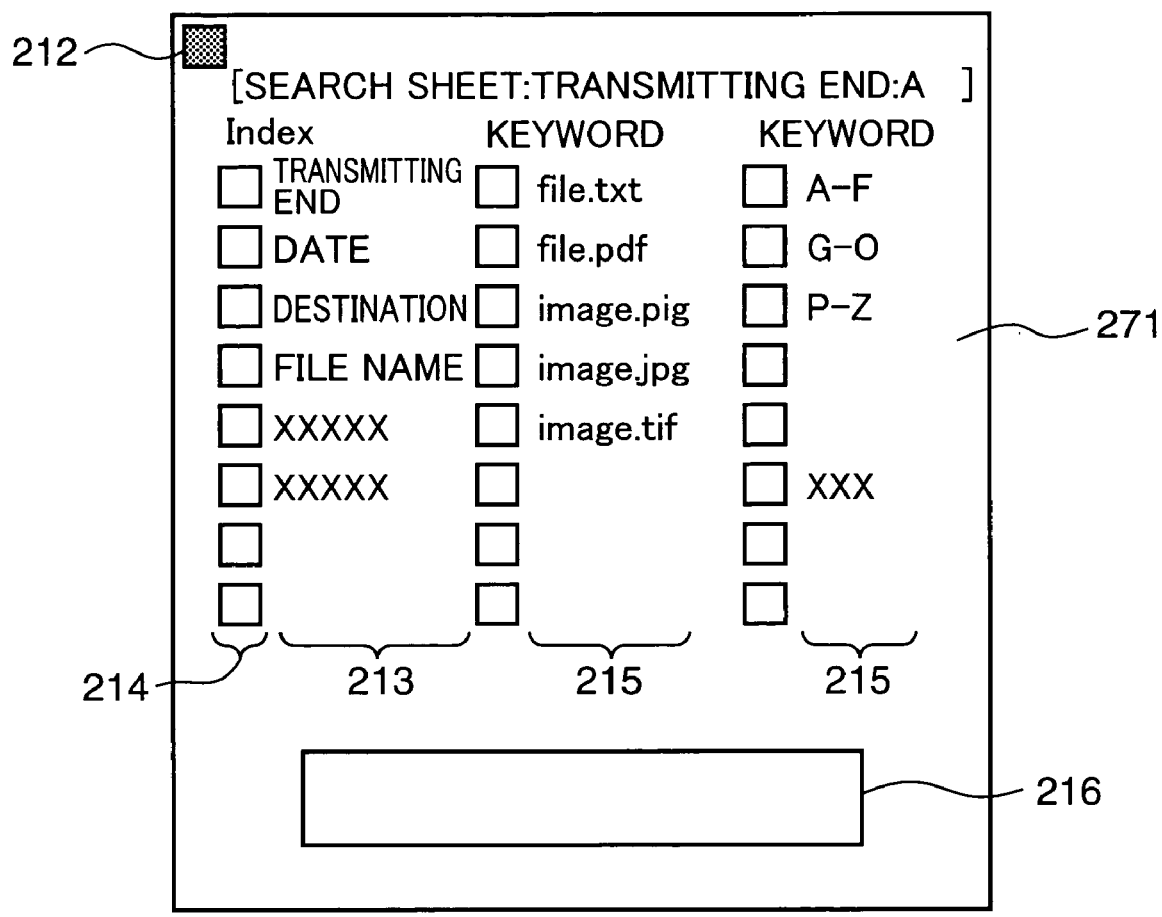
FIG. 7 is a diagram showing another example of the search sheet according to the embodiment.

Although the search sheet in this embodiment includes the two-dimensional code, the search items, the search keywords and the check boxes, the present invention is not particularly limited thereto. The search sheet may include the two-dimensional code, the search items, the search keywords, the check boxes and a keyword entry area in which the user can directly write a keyword down. FIG. 7 is a diagram showing another example of the search sheet according to the present invention. As shown in FIG. 7, a keyword entry area 216 is printed at a bottom part of a search sheet 271. A keyword is written down in this keyword entry area 216 by the user. In such a case, the search sheet 271 having the keyword written down in the keyword entry area 216 is read by the scanner unit 13, and the control unit 12 converts the keyword written down in the keyword entry area 216 into a character data by the OCR (optical character recognition) and searches data corresponding with the converted character data.

In this way, the printer unit 15 prints the search sheet further including the keyword entry area 216 for enabling the user to write a keyword down, and the scanner unit 13 reads the search sheet having the search keyword written down in the keyword entry area 216 of search sheet 271 by the user.

Then, the data searching device 128 recognizes the search keyword written down by the user and searches data corresponding with the recognized search keyword, and the display controller 125 causes the touch panel section 161 to display a search result given by the data searching device 128.

Since the search keyword hand-written on the search sheet is recognized and data corresponding with the recognized search keyword are searched, a cumbersome operation of entering a search keyword by means of the touch panel section 161 becomes unnecessary, thereby improving operability.

The aforementioned specific embodiment is mainly embraced by inventions having the following constructions.

An inventive image forming apparatus comprises data storage device for storing a plurality of data while compiling the data into a database; reader for reading a search sheet having at least one search item or search keyword selected by a user; data searcher for specifying the search item based on a search sheet image read by the reader and searching data corresponding to the specified search item in the data storage device or specifying the search keyword based on the search sheet image read by the reader and searching data corresponding with the specified search keyword in the data storage device; and display device for displaying a search result given by the data searcher.

According to this construction, a plurality of data are stored in the data storage device while being compiled into the database, and the search sheet having at least one search item or search keyword selected by the user is read by the reader. Subsequently, the search item is specified based on the search sheet image read by the reader and the data corresponding to the specified search item are searched by the data searcher. Alternatively, the search keyword is specified based on the search sheet image read by the reader and the data corresponding with the specified search keyword are searched by the data searcher. The search result given by the data searcher is displayed by the display device.

Since at least one search item or search keyword is selected from a plurality of search items or a plurality of search keywords using the printed search sheet, a cumbersome operation of entering a search keyword by means of the display device becomes unnecessary, thereby improving operability in data search.

Preferably, the above image forming apparatus may further comprise a receiver for receiving an instruction to print the search sheet for selecting at least one search item or search keyword from a plurality of search items or a plurality of search keywords, and a printer for printing the search sheet if the instruction to print the search sheet is received by the receiver.

According to this construction, the instruction to print the search sheet for selecting at least one search item or search keyword from a plurality of search items or a plurality of search keywords is received by the receiver, and the search sheet is printed by the printer if the instruction to print the search sheet is received by the receiver.

Since a plurality of search items or a plurality of search keywords are printed on the search sheet, all the search items or all the search keywords can be presented to the user even if it is difficult to display all the search items or all the search keywords on the display device of the image forming apparatus.

In the above image forming apparatus, the receiver may preferably receive an instruction to print another search sheet for selecting another search item or search keyword from a plurality of search items or a plurality of search keywords if there are a plurality of data corresponding to the specified search item or corresponding with the specified keyword as a result of the search by the data searcher.

According to this construction, the instruction to print the other search sheet for selecting another search item or search keyword from a plurality of search items or a plurality of search keywords is received by the receiver if there are a plurality of data corresponding to the specified search item or corresponding with the specified keyword as a result of the search by the data searcher.

Since the search sheet for selecting another search item or search keyword is printed if there are a plurality of data corresponding to the specified search item or corresponding with the specified keyword as a result of the search by the data searcher, data desired by the user can be finally presented by repeatedly printing the search sheet, reading the search sheet and searching the data.

In the above image forming apparatus, it may be preferable that the printer prints the search sheet including a plurality of search items or a plurality of search keywords and check boxes corresponding to the plurality of search items or the plurality of search keywords; the reader reads the search sheet having the check box(es) corresponding to the search item or search keyword(s), by which the user desires a search to be executed, checked by the user; the data searcher specifies the search items corresponding to the check box checked by the user and searches data corresponding to the specified search item in the data storage device or specifies the search keyword(s) corresponding to the check box checked by the user and searches data corresponding with the specified keyword in the data storage device.

According to this construction, the printer prints the search sheet including the plurality of search items or the plurality of search keywords and the check boxes corresponding to the plurality of search items or the plurality of search keywords, and the reader reads the search sheet having the check box(es) corresponding to the search item or search keyword(s), by which the user desires the search to be executed, checked by the user. Then, the data searcher specifies the search item corresponding to the check box checked by the user and searches the data corresponding to the specified search item or specifies the search keyword(s) corresponding to the check box checked by the user and searches the data corresponding with the specified search keyword(s).

Thus, the plurality of search items or the plurality of search keywords and the check boxes are printed on the search sheet and the user can easily designate the search item or the search keyword(s) by writing the check mark(s) down in the check box(es) corresponding to the desired search item or search keyword(s).

In the above image forming apparatus, it may be preferable that the printer prints the search sheet further including a character entry area used for the user to write a search keyword down; the reader reads the search sheet having the search keyword written down in the character entry area of the search sheet by the user; and the data searcher recognizes the search keyword written down by the user and searches data corresponding with the recognized search keyword.

According to this construction, the printer prints the search sheet including the character entry area used for the user to write the search keyword down, and the reader reads the search sheet having the search keyword written down in the character entry area by the user. Then, the data searcher recognizes the search keyword written by the user and searches the data corresponding with the recognized search keyword in the data storage device.

Since the search keyword hand-written on the search sheet is recognized and the data corresponding with the recognized search keyword, a cumbersome operation of entering the search keyword by means of the operation unit becomes unnecessary, thereby improving operability.

Preferably, the above image forming apparatus may further comprise a two-dimensional code generator for generating a two-dimensional code including position information specifying the positions of the check boxes or the search keywords on the image read by the reader, wherein the printer prints the two-dimensional code generated by the two-dimensional code generator at a specified position of the search sheet; the reader reads the two-dimensional code printed at the specified position of the search sheet by the printer; the data searcher analyzes the two-dimensional code read by the reader, specifies the search item or search keyword corresponding to the check box checked by the user on the search sheet image based on the position information included in the analyzed two-dimensional code, and searches data corresponding to the specified search item or data corresponding with the specified search keyword in the data storage device.

According to this construction, the two-dimensional code generator generates the two-dimensional code for specifying the positions of the check boxes or the search keywords on the image read by the reader, and the printer prints the two-dimensional code generated by the two-dimensional code generator at the specified position of the search sheet. Then, the reader reads the two-dimensional code printed at the specified position of the search sheet by the printer. Subsequently, the data searcher analyzes the two-dimensional code read by the reader, specifies the search item or the search keyword corresponding to the check box checked by the user on the search sheet image based on the position information included in the analyzed two-dimensional code, and searches the data corresponding to the specified search item or corresponding with the specified search keyword in the data storage device.

Since the positions of the check boxes are specified by the two-dimensional code, it is not necessary to specify a reading direction upon reading the search sheet and the search item or the search keyword selected by the user can be specified regardless of in which direction the search sheet is read.

In the above image forming apparatus, it may be preferable that the two-dimensional code generator generates a two-dimensional code including recognition information used to recognize whether or not the data search is to be executed; and the data searcher analyzes the two-dimensional code read by the reader, specifies a search item based on the search sheet image read by the reader and searches data corresponding to the specified search item in the data storage device or specifies a search keyword based on the search sheet image read by the reader and searches data corresponding with the specified search keyword in the data storage device if the recognition information is included in the analyzed two-dimensional code.

According to this construction, the two-dimensional code generator generates the two-dimensional code including the recognition information and the printer prints the two-dimensional code generated by the two-dimensional code generator at the specified position of the search sheet. Then, the reader reads the two-dimensional code printed at the specified position of the search sheet by the printer. Subsequently, the data searcher analyzes the two-dimensional code read by the reader, specifies the search item based on the search sheet image read by the reader and searches the data corresponding to the specified search item in the data storage device or specifies the search keyword based on the search sheet image read by the reader and searches the data corresponding with the specified search keyword in the data storage device if the recognition information is included in the analyzed two-dimensional code.

Since whether or not the read document is the search sheet for data search is judged by analyzing the two-dimensional code, it is not necessary to switch to a search function upon the data search, and the search function is automatically set to enable the execution of the data search.

In the above image forming apparatus, the data storage device may preferably store facsimile data received via a telephone circuit, transmitting ends of the facsimile data and dates of receiving the facsimile data while compiling them into the database.

According to this construction, since the facsimile data received via the telephone circuit, the transmitting ends of the facsimile data and the dates of receiving the facsimile data are stored in the data storage device while being compiled into the database, a cumbersome operation of entering a search keyword using the display device becomes unnecessary and operability in the search of the received facsimile data can be improved.

In the above image forming apparatus, the receiver may preferably receive an instruction to print a search sheet for selecting at least one search item from the transmitting ends of facsimile data received via the telephone circuit and dates of receiving the facsimile data.

According to this construction, since the instruction to print the search sheet for selecting at least one search item from the transmitting ends of the facsimile data received via the telephone circuit and the dates of receiving the facsimile data is received by the receiver, the facsimile data can be specified by these search items and the received facsimile data can be easily searched.

In the above image forming apparatus, the data storage device may preferably store facsimile data transmitted via a telephone circuit, destinations of the facsimile data and dates of transmitting the facsimile data while compiling them into the database.

According to this construction, since the facsimile data transmitted via the telephone circuit, the destinations of the facsimile data and the dates of transmitting the facsimile data are stored in the data storage device while being compiled into the database, a cumbersome operation of entering a search keyword using the display device becomes unnecessary and operability in the search of the transmitted facsimile data can be improved.

In the above image forming apparatus, the receiver may preferably receive an instruction to print a search sheet for selecting at least one search item from the destinations of the facsimile data transmitted via the telephone circuit and the dates of transmitting the facsimile data.

According to this construction, since the instruction to print the search sheet for selecting at least one search item from the destinations of the facsimile data transmitted via the telephone circuit and the dates of transmitting the facsimile data is received by the receiver, the facsimile data can be specified by these search items and the transmitted facsimile data can be easily searched.

In the above image forming apparatus, the data storage device may preferably store image data received from external apparatuses, file names of the image data, transmitting ends of the image data and dates of receiving the image data while compiling them into a database.

According to this construction, since the image data received from the external apparatuses, the file names of the image data, the transmitting ends of the image data and the dates of receiving the image data are stored in the data storage device while being complied into the database, a cumbersome operation of entering a search keyword using the display device becomes unnecessary, thereby improving operability in the data search for the image data received from the external apparatuses.

In the above image forming apparatus, the receiver may preferably receive an instruction to print a search sheet for selecting at least one search item from the file names of the image data received from the external apparatuses, the transmitting ends of the image data and the dates of receiving the image data.

According to this construction, since the instruction to print the search sheet for selecting at least one search item from the file names of the image data received from the external apparatuses, the transmitting ends of the image data and the dates of receiving the image data is received by the receiver, the image data can be specified by these search items and the image data received from the external apparatuses can be easily searched.

In the above image forming apparatus, it may be preferable that the reader reads documents and the data storage device stores document data read by the reader and dates of reading the document data while compiling them into a database.

According to this construction, since the documents are read by the reader and the document data read by the reader and the dates of reading the document data are stored in the data storage device while being compiled into the database, a cumbersome operation of entering a search keyword using the display device becomes unnecessary, thereby improving operability in the data search for the document data.

In the above image forming apparatus, it may be preferable that the reader reads documents and the receiver receives an instruction to print a search sheet for selecting the date of reading the document data by the reader.

According to this construction, since the documents are read by the reader and the instruction to print the search sheet for selecting the date of reading the document data is received by the receiver, the document data can be specified by the reading dates as the search items, and the read document data can be easily searched.

The above image forming apparatus may preferably further comprise a keyword entry receiver for receiving the entry of a search keyword by the user, and the data searcher searches data corresponding with the search keyword received by the keyword entry receiver in the data storage device.

According to this construction, the entry of the search keyword by the user is received by the keyword entry receiver, and the data storage device searches the data corresponding with the search keyword received by the keyword entry receiver. If there are a plurality of data corresponding with the search keyword as a result of the search by the data searcher, an instruction to print a search sheet for selecting another search item or search keyword from a plurality of search items or a plurality of search keywords is received by the receiver.

Since the entry of the search keyword by the user is first received and the data corresponding with the search keyword are searched in the data storage device, the search items or the search keywords to be printed on the search sheet can be narrowed down to a certain degree, wherefore the number of the search sheets to be printed can be reduced.

The above image forming apparatus may preferably further comprise a search item display device for displaying a plurality of search items and a search item receiver for receiving the selection of a search item displayed by the search item display device by the user, and the data searcher searches data corresponding to the search item received by the search item receiver in the data storage device.

According to this construction, a plurality of search items are displayed by the search item display device, the selection of the search item displayed by the search item display device by the user is received by the search item receiver, and the data corresponding to the search item received by the search item receiver are searched in the data storage device. If there are a plurality of data corresponding to the search item as a result of the search by the data searcher, an instruction to print a search sheet for selecting another search item or search keyword from a plurality of search items or a plurality of search keywords is received by the receiver.

Since a plurality of search items are first displayed, the selection of the displayed search item by the user is received and the data corresponding to the received search item are searched in the data storage device, the search items or the search keywords to be printed on the search sheet can be narrowed down to a certain degree, wherefore the number of the search sheets to be printed can be reduced.

In the above image forming apparatus, the two-dimensional code generator may preferably generate a two-dimensional code including search pattern information representing which search items have been selected if a plurality of search items have already been selected.

According to this construction, the two-dimensional code including the search pattern information representing which search items have been selected is generated by the two-dimensional code generator if a plurality of search items have already been selected. Thus, which search items have been selected can be recognized using this search pattern information, wherefore the search processing can be easily executed.

In the above image forming apparatus, the display device may preferably display data if the data are specified as a result of the search by the data searcher.

According to this construction, since the data is displayed by the display device if being specified as a result of the search by the data storage device, the user can recognize the displayed data and can print this data if it is a desired data.

In the above image forming apparatus, it may be preferable that the position information includes position coordinates of the check boxes or those of the search keywords on the image read by the reader and that the data searcher analyzes the two-dimensional code read by the reader, specifies the search item or the search keyword corresponding to the check box checked by the user on the search sheet image based on the position coordinates included in the analyzed two-dimensional code, and searches data corresponding to the specified search item or corresponding with the specified search keyword in the data storage device.

According to this construction, the position information includes the position coordinates of the check boxes or those of the search keywords on the image read by the reader, and the data searcher analyzes the two-dimensional code read by the reader, specifies the search item or search keyword corresponding to the check box checked by the user on the search sheet image based on the position information included in the analyzed two-dimensional code, and searches data corresponding to the specified search item or data corresponding with the specified search keyword in the data storage device.

Thus, the search item or the search keyword corresponding to the check box checked by the user can be easily specified by using the position coordinates of the check boxes or those of the search keywords on the image read by the reader.

This application is based on patent application No. 2004-345969 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image forming apparatus, comprising:

a storage device for storing a plurality of data while compiling them into a database, a reader for reading a search sheet having at least one search item or search keyword selected by a user thereon, a data searcher for specifying the search item based on a search sheet image read by the reader and searching data corresponding to the specified search item in the storage device or specifying the search keyword based on the search sheet image read by the reader and searching data corresponding with the specified search keyword, a display device for displaying a search result given by the data searcher a receiver for receiving an instruction to print the search sheet for selecting at least search item or search keyword from a plurality of search items or a plurality of search keywords, a printer for printing the search sheet if the instruction to print the search sheet is received by the receiver, and a two-dimensional code generator for generating a two-dimensional code including position information for specifying the positions of the check boxes or those of the search keywords on the image read by the reader, wherein:

the printer prints a search sheet including a plurality of search items or a plurality of search keywords and check boxes corresponding to the plurality of search items or the plurality of search keywords, the reader reads the search sheet having the check box corresponding to the search item or search keyword, by which the user desires a search to be executed, checked by the user, and the data searcher specifies the search item corresponding to the check box checked by the user and searches data corresponding to the specified search item in the storage device or specifies the search keyword corresponding to the check box checked by the user and searches data corresponding with the specified search keyword, the printer prints the two-dimensional code generated by the two-dimensional code generator at a specified position of the search sheet, the reader reads the two-dimensional code printed at the specified position of the search sheet by the printer, and the data searcher analyzes the two-dimensional code read by the reader, specifies the search item or search keyword corresponding to the check box checked by the user on the search sheet image based on the position information included in the analyzed two-dimensional code and searches data corresponding to the specified data search or corresponding with the specified search keyword in the storage device.

2. An image forming apparatus according to claim 1, wherein the receiver receives an instruction to print a search sheet for selecting another search item or search keyword from the plurality of search items or the plurality of search keywords if there are a plurality of data corresponding to the specified search item or corresponding with to the specified search keyword as a result of the search by the data searcher.

3. An image forming apparatus according to claim 2, further comprising a keyword entry receiver for receiving the entry of a search keyword by the user, wherein the data searcher searches data corresponding with the search keyword received by the keyword entry receiver in the storage device.

4. An image forming apparatus according to claim 2, further comprising a search item display device for displaying a plurality of search items, and a search item receiver for receiving the selection of the search item displayed by the search item display device by the user, wherein the data searcher searches data corresponding to the search item received by the search item receiver.

5. An image forming apparatus according to claim 1, wherein:

the printer prints a search sheet additionally including a character entry area for enabling the user to write a search keyword down, the reader reads the search sheet having the search keyword written down in the character entry area by the user, and the data searcher recognizes the search keyword written down by the user and searches data corresponding with the recognized search keyword in the storage device.

6. An image forming apparatus according to claim 1, wherein:

the two-dimensional code generator generates a two-dimensional code including recognition information used to recognize whether or not a data search is to be executed, the data searcher specifies the search item based on the search sheet image read by the reader and searches data corresponding to the specified search item in the storage device or specified the search keyword based on the search sheet image read by the reader and searches data corresponding with the specified search keyword in the storage device.

7. An image forming apparatus according to claim 1, wherein the storage device stores facsimile data received via a telephone circuit, transmitting ends of the facsimile data and dates of receiving the facsimile data while compiling them into the database.

8. An image forming apparatus according to claim 1, wherein the receiver receives an instruction to print a search sheet for selecting at least one search item from transmitting ends of facsimile data transmitted via a telephone circuit and dates of receiving the facsimile data.

9. An image forming apparatus according to claim 1, wherein the storage device stores facsimile data transmitted via a telephone circuit, destinations of the facsimile data and dates of transmitting the facsimile data while compiling them into the database.

10. An image forming apparatus according to claim 1, wherein the receiver receives an instruction to print a search sheet for selecting at least one search item from destinations of facsimile data and dates of transmitting the facsimile data.

11. An image forming apparatus according to claim 1, wherein the storage device stores image data received from external apparatuses, file names of the image data, transmitting ends of the image data and dates of receiving the image data while compiling them into the database.

12. An image forming apparatus according to claim 1, wherein the receiver receives an instruction to print a search sheet for selecting at least one search item from file names of image data, transmitting ends of the image data and dates of receiving the image data.

13. An image forming apparatus according to claim 1, wherein the reader reads documents, and the storage device stores document data read by the reader and dates of reading the document data while compiling them into the database.

14. An image forming apparatus according to claim 1, wherein the reader reads documents and the receiver receives an instruction to print a search sheet for selecting the dates of reading the document data by the reader.

15. An image forming apparatus according to claim 1, wherein the two-dimensional code generator generates a two-dimensional code including search pattern information representing which search items have been selected if a plurality of search items have already been selected.

16. An image forming apparatus according to claim 1, wherein the display device displays data if the data are specified as a result of the search by the data searcher.

17. An image forming apparatus according to claim 1, wherein:

the position information includes position coordinates of the check boxes or those of the search keywords on the image read by the reader, and the data searcher analyzes the two-dimensional code read by the reader, specifies the search item or the search keyword corresponding to the check box checked by the user on the search sheet image based on the position coordinates included in the analyzed two-dimensional code, and searches data corresponding to the specified search item or corresponding with the specified search keywords in the storage device.

* * * * *